US011217183B2

(12) United States Patent
Shi et al.

(10) Patent No.: US 11,217,183 B2
(45) Date of Patent: Jan. 4, 2022

(54) PIXEL CIRCUIT AND DRIVING METHOD THEREOF AND DISPLAY APPARATUS

(71) Applicant: BOE TECHNOLOGY GROUP CO., LTD., Beijing (CN)

(72) Inventors: Rongrong Shi, Beijing (CN); Shengji Yang, Beijing (CN); Wei Liu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 43 days.

(21) Appl. No.: 16/643,093

(22) PCT Filed: Jul. 23, 2019

(86) PCT No.: PCT/CN2019/097200
§ 371 (c)(1),
(2) Date: Feb. 28, 2020

(87) PCT Pub. No.: WO2020/020118
PCT Pub. Date: Jan. 30, 2020

(65) Prior Publication Data

US 2020/0202793 A1 Jun. 25, 2020

(30) Foreign Application Priority Data

Jul. 24, 2018 (CN) ........................ 201810821748.6

(51) Int. Cl.
*G06F 1/00* (2006.01)
*G09G 3/3291* (2016.01)
(Continued)

(52) U.S. Cl.
CPC ......... *G09G 3/3291* (2013.01); *G09G 3/3241* (2013.01); *G09G 3/3266* (2013.01); *G09G 2300/0847* (2013.01)

(58) Field of Classification Search
None
See application file for complete search history.

(56) References Cited

U.S. PATENT DOCUMENTS

2008/0284688 A1 11/2008 Marx et al.
2011/0148937 A1 6/2011 Park et al.
(Continued)

FOREIGN PATENT DOCUMENTS

CN 1965341 A 5/2007
CN 202584685 U 12/2012
(Continued)

OTHER PUBLICATIONS

International Search Report and Written Opinion issued in corresponding International Application No. PCT/CN2019/097200, dated Oct. 21, 2019, with English language translation.
(Continued)

*Primary Examiner* — Michael A Faragalla
(74) *Attorney, Agent, or Firm* — McDermott Will and Emery LLP

(57) ABSTRACT

A pixel circuit, includes: a driving signal generating sub-circuit configured to generate and output an initial driving signal; a voltage boost sub-circuit electrically connected to the driving signal generating sub-circuit, and configured to receive the initial driving signal, amplify the initial driving signal to generate a target driving signal, and output the target driving signal; and a light-emitting sub-circuit electrically connected to the voltage boost sub-circuit, and configured to receive the target driving signal and be driven by the target driving signal to emit light.

19 Claims, 8 Drawing Sheets

(51) Int. Cl.
*G09G 3/3241* (2016.01)
*G09G 3/3266* (2016.01)

(56) References Cited

U.S. PATENT DOCUMENTS

| | | | | |
|---|---|---|---|---|
| 2012/0249516 | A1 | 10/2012 | Wacyk et al. | |
| 2016/0111064 | A1* | 4/2016 | Kao | G09G 3/2014 345/691 |
| 2016/0267837 | A1* | 9/2016 | Wang | G09G 3/3283 |
| 2020/0202793 | A1 | 6/2020 | Shi et al. | |

FOREIGN PATENT DOCUMENTS

| | | | |
|---|---|---|---|
| CN | 103956138 | A | 7/2014 |
| CN | 102655703 | B | 9/2014 |
| CN | 104392689 | A | 3/2015 |
| CN | 104409044 | A | 3/2015 |
| CN | 104575366 | A | 4/2015 |
| CN | 108877671 | A | 11/2018 |
| KR | 10-2013-0132708 | A | 12/2013 |

OTHER PUBLICATIONS

First Chinese Office Action issued in corresponding Chinese Application No. 201810821748.6, dated Dec. 10, 2019, with English language translation.

* cited by examiner

PIXEL CIRCUIT AND DRIVING METHOD THEREOF AND DISPLAY APPARATUS

CROSS-REFERENCE TO RELATED APPLICATIONS

This application is a national phase entry under 35 USC 371 of International Patent Application No. PCT/CN2019/097200 filed on Jul. 23, 2019, which claims priority to Chinese Patent Application No. 201810821748.6, filed with the Chinese Patent Office on Jul. 24, 2018, titled "A PIXEL CIRCUIT AND DRIVING METHOD THEREOF, AND DISPLAY APPARATUS", the contents of which are incorporated herein by reference in their entirety.

TECHNICAL FIELD

The present disclosure relates to the field of display technologies, and in particular, to a pixel circuit and a driving method thereof, and a display apparatus.

BACKGROUND

An organic light-emitting diode (OLEO) display apparatus has advantages such as thinness, lightness, a wide viewing angle, active luminescence, continuously adjustable luminous colors, low cost, high color gamut, high contrast, a fast response speed, low energy consumption, a low driving voltage, a wide operating temperatures range, a simple manufacturing process, high luminescence efficiency, a good shock resistance, flexible display and the like. Therefore, the OLED display apparatus is widely used in display field.

SUMMARY

In one aspect, a pixel circuit is provided. The pixel circuit includes: a driving signal generating sub-circuit configured to generate and output an initial driving signal. A voltage boost sub-circuit electrically connected to the driving signal generating sub-circuit and configured to receive the initial driving signal, amplify the initial driving signal to generate a target driving signal, and output the target driving signal. A light-emitting sub-circuit electrically connected to the voltage boost sub-circuit and configured to receive the target driving signal and be driven by the target driving signal to emit light.

In some embodiments, the voltage boost sub-circuit includes: a bipolar junction transistor having a base, a collector and an emitter. A first resistor electrically connected between the driving signal generating sub-circuit and the base of the bipolar junction transistor. A second resistor electrically connected between a first voltage terminal and the collector of the bipolar junction transistor. And a third resistor electrically connected between a second voltage terminal and the emitter of the bipolar junction transistor. The emitter of the bipolar junction transistor is further electrically connected to the light-emitting sub-circuit.

In some embodiments, the bipolar junction transistor includes a silicon transistor.

In some embodiments, the driving signal generating sub-circuit includes a first transistor, a second transistor, a third transistor and a first storage capacitor. A control electrode of the first transistor is electrically connected to a first scanning signal terminal, a first electrode of the first transistor is electrically connected to a data voltage terminal, and a second electrode of the first transistor is electrically connected to a first terminal of the first storage capacitor. A control electrode of the second transistor is electrically connected to the second electrode of the first transistor and the first terminal of the first storage capacitor, a first electrode of the second transistor is electrically connected to a second electrode of the third transistor, and a second electrode of the second transistor is electrically connected to the voltage boost sub-circuit. A control electrode of the third transistor is electrically connected to an enabling signal terminal, and a first electrode of the third transistor is electrically connected to a third voltage terminal. A second terminal of the first storage capacitor is electrically connected to a fourth voltage terminal.

In some embodiments, the driving signal generating sub-circuit further includes a fourth transistor. A control electrode of the fourth transistor is electrically connected to a second scanning signal terminal, a first electrode of the fourth transistor is electrically connected to the data voltage terminal, and a second electrode of the fourth transistor is electrically connected to the first terminal of the first storage capacitor.

In some embodiments, one of the first transistor and the fourth transistor is an N-type transistor, and another of the first transistor and the fourth transistor is a P-type transistor.

In some embodiments, the driving signal generating sub-circuit further includes a fifth transistor. A control electrode of the fifth transistor is electrically connected to a first reset signal terminal, a first electrode of the fifth transistor is electrically connected to a fifth voltage terminal, and a second electrode of the fifth transistor is electrically connected to the second electrode of the second transistor and the voltage boost sub-circuit.

In some embodiments, the voltage boost sub-circuit is electrically connected to a first voltage terminal, and the voltage boost sub-circuit is configured to receive a voltage signal from the first voltage terminal that is the same as a voltage signal received by the driving signal generating sub-circuit from the third voltage terminal.

In some embodiments, the driving signal generating sub-circuit includes a sixth transistor, a seventh transistor and a second storage capacitor. A control electrode of the sixth transistor is electrically connected to a third scanning signal terminal, a first electrode of the sixth transistor is electrically connected to a data voltage terminal, and a second electrode of the sixth transistor is electrically connected to a first terminal of the second storage capacitor. A control electrode of the seventh transistor is electrically connected to the second electrode of the sixth transistor and the first terminal of the second storage capacitor, a first electrode of the seventh transistor is electrically connected to a second terminal of the second storage capacitor and a sixth voltage terminal, and a second electrode of the seventh transistor is electrically connected to the voltage boost sub-circuit.

In some embodiments, the driving signal generating sub-circuit further includes an eighth transistor. A control electrode of the eighth transistor is electrically connected to a fourth scanning signal terminal, a first electrode of the eighth transistor is electrically connected to the data voltage terminal, and a second electrode of the eighth transistor is electrically connected to the control electrode of the seventh transistor and the first terminal of the second storage capacitor.

In some embodiments, one of the sixth transistor and the eighth transistor is an N-type transistor, and another of the sixth transistor and the eighth transistor is a P-type transistor.

In some embodiments, the driving signal generating sub-circuit further includes a ninth transistor. A control electrode of the ninth transistor is electrically connected to a second reset signal terminal, a first electrode of the ninth transistor is electrically connected to a seventh voltage terminal, and a second electrode of the ninth transistor is electrically connected to the second electrode of the seventh transistor and the voltage boost sub-circuit.

In some embodiments, the voltage boost sub-circuit is electrically connected to a first voltage terminal, and the voltage boost sub-circuit is configured to receive a voltage signal from the first voltage terminal that is the same as a voltage signal received by the driving signal generating sub-circuit from the sixth voltage terminal.

In some embodiments, the light-emitting sub-circuit includes a self-emitting-light device. An anode of the self-emitting-light device is electrically connected to the voltage boost sub-circuit, and a cathode of the self-emitting-light device is electrically connected to an eighth voltage terminal.

In some embodiments, the light-emitting sub-circuit further includes a fourth resistor. The fourth resistor is electrically connected between the anode of the self-emitting-light device and the voltage boost sub-circuit.

In some embodiments, the driving signal generating sub-circuit includes a first transistor, a second transistor, a third transistor, a fourth transistor, a fifth transistor and a first storage capacitor. A control electrode of the first transistor is electrically connected to a first scanning signal terminal, a first electrode of the first transistor is electrically connected to a data voltage terminal, and a second electrode of the first transistor is electrically connected to a first terminal of the first storage capacitor. A second terminal of the first storage capacitor is electrically connected to a fourth voltage terminal. A control electrode of the second transistor is electrically connected to the second electrode of the first transistor and the first terminal of the first storage capacitor, a first electrode of the second transistor is electrically connected to a second electrode of the third transistor, and a second electrode of the second transistor is electrically connected to the voltage boost sub-circuit. A control electrode of the third transistor is electrically connected to an enabling signal terminal, and a first electrode of the third transistor is electrically connected to a third voltage terminal. A control electrode of the fourth transistor is electrically connected to a second scanning signal terminal, a first electrode of the fourth transistor is electrically connected to the data voltage terminal, and a second electrode of the fourth transistor is electrically connected to the control electrode of the second transistor and the first terminal of the first storage capacitor. A control electrode of the fifth transistor is electrically connected to a first reset signal terminal, a first electrode of the fifth transistor is electrically connected to a fifth voltage terminal, and a second electrode of the fifth transistor is electrically connected to the second electrode of the second transistor and the voltage boost sub-circuit. One of the first transistor and the fourth transistor is an N-type transistor, and another of the first transistor and the fourth transistor is a P-type transistor. The voltage boost sub-circuit is electrically connected to a first voltage terminal.

In some embodiments, the driving signal generating sub-circuit includes a sixth transistor, a seventh transistor, an eighth transistor, a ninth transistor and a second storage capacitor. A control electrode of the sixth transistor is electrically connected to a third scanning signal terminal, a first electrode of the sixth transistor is electrically connected to a data voltage terminal, and a second electrode of the sixth transistor is electrically connected to a first terminal of the second storage capacitor. A control electrode of the sixth transistor is electrically connected to a third scanning signal terminal, a first electrode of the sixth transistor is electrically connected to a data voltage terminal, and a second electrode of the sixth transistor is electrically connected to a first terminal of the second storage capacitor. A control electrode of the seventh transistor is electrically connected to the second electrode of the sixth transistor and the first terminal of the second storage capacitor, a first electrode of the seventh transistor is electrically connected to a second terminal of the second storage capacitor and a sixth voltage terminal, and a second electrode of the seventh transistor is electrically connected to the voltage boost sub-circuit. A control electrode of the eighth transistor is electrically connected to a fourth scanning signal terminal, a first electrode of the eighth transistor is electrically connected to the data voltage terminal, and a second electrode of the eighth transistor is electrically connected to the control electrode of the seventh transistor and the first terminal of the second storage capacitor. A control electrode of the ninth transistor is electrically connected to a second reset signal terminal, a first electrode of the ninth transistor is electrically connected to a seventh voltage terminal, and a second electrode of the ninth transistor is electrically connected to the second electrode of the seventh transistor and the voltage boost sub-circuit, One of the sixth transistor and the eighth transistor is an N-type transistor, and another of the sixth transistor and the eighth transistor is a P-type transistor. The voltage boost sub-circuit is electrically connected to a first voltage terminal.

In another aspect, a display apparatus is provided. The display apparatus includes the pixel circuit according to any one of the above embodiments.

In yet another aspect, a method driving of the pixel circuit according to any one of the above embodiments is provided. The driving method includes: generating, by the driving signal generating sub-circuit, an initial driving signal, and outputting, by the driving signal generating sub-circuit, the initial driving signal; receiving, by the voltage boost sub-circuit, the initial driving signal, amplifying, by the voltage boost sub-circuit, the initial driving signal to generate a target driving signal, and outputting, by the voltage boost sub-circuit, the target driving signal; receiving, by the light-emitting sub-circuit, the target driving signal, and emitting, by a self-emitting-light device in the light-emitting sub-circuit, light under driving of the target driving signal.

In some embodiments, the driving signal generating sub-circuit includes a first transistor, a second transistor, a third transistor, a fourth transistor and a first storage capacitor. Generating, by the driving signal generating sub-circuit, the initial driving signal includes: the first transistor being turned on under control of a first scanning signal output via a first scanning signal terminal, and the fourth transistor being turned on under control of a second scanning signal output via a second scanning signal terminal; transmitting, by the first transistor and the fourth transistor, a data voltage signal output via a data voltage terminal to both the first storage capacitor and a control electrode of the second transistor, and storing, by the first storage capacitor; and the third transistor being turned on under control of an enabling signal output via an enabling signal terminal, transmitting, by the third transistor, a third voltage signal output via a third voltage terminal to the second transistor, and outputting, by the second transistor, as an initial driving signal via the second electrode of the second transistor.

BRIEF DESCRIPTION OF THE DRAWINGS

In order to describe technical solutions in embodiments of the present disclosure more clearly, the accompanying drawings to be used in the description of embodiments will be introduced briefly below. Obviously, the accompanying drawings described below are merely some embodiments of the present disclosure, and a person of ordinary skill in the art can obtain other drawings according to these drawings.

DETAILED DESCRIPTION

Some embodiments of the present disclosure will be described below in combination with the accompanying drawings. Obviously, the described embodiments are merely some but not all of the embodiments of the present disclosure. All other embodiments made on the basis of the embodiments of the present disclosure by a person of ordinary skill in the art shall be included in the protection scope of the present disclosure.

Figure 1:
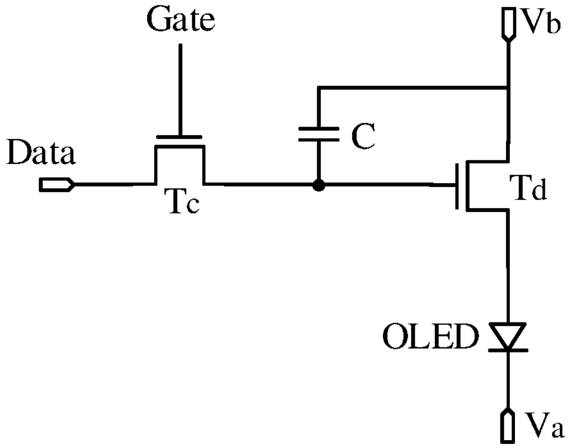
FIG. 1 is a schematic diagram showing a structure of a pixel circuit in the related art.

An organic light-emitting diode (OLED) display apparatus includes a plurality of sub-pixels, and each sub-pixel is provided with a pixel circuit. In the related art, as shown in FIG. 1, an active-matrix organic light-emitting diode (AMOLED) pixel circuit includes two thin film transistors (a switching transistor $T_C$ and a driving transistor $T_d$), a storage capacitor C, and an OLED light-emitting device. During a driving process, the switching transistor $T_C$ is turned on, and a data voltage signal from a data voltage terminal Data is written into the storage capacitor C to control the driving transistor $T_d$ to work in a saturation region, so that a voltage from a voltage terminal $V_b$ is input to the driving transistor $T_d$, and transformed into a constant current. Therefore, the OLED light-emitting device is driven to emit light within a frame time.

The OLED light-emitting device is a current-controlled element. A current input to the OLED light-emitting device is controlled by the data voltage signal input via the data voltage terminal Data, and is also affected by a threshold voltage of the driving transistor $T_d$. In an existing OLED display apparatus, a voltage of the data voltage signal input via the data voltage terminal Data is low, and a voltage at a voltage terminal $V_a$ is limited. As a result, a voltage across the OLED light-emitting device cannot meet a requirement of high luminance. If the luminance of the OLED light-emitting device is increased by changing the voltage of the data voltage signal, on one hand, parameters of transistors in the pixel circuit need to be changed and devices such as circuits need to be redesigned, which make the process tedious; on the other hand, there is a body effect in the driving transistor $T_d$, that is, there is a large threshold voltage drift in the driving transistor $T_d$. In a case where the voltage of the data voltage signal is high, there is a larger voltage loss at the driving transistor $T_d$, so that a voltage drop of the data voltage signal is large when the data voltage signal is transmitted to the OLED light-emitting device. As a result, only a lower driving voltage can be input to the OLED light-emitting device. The luminance of the OLED light-emitting device still be low, and the OLED display apparatus fails in a display with high brightness, thereby reducing an applicable scope of the OLED display apparatus.

Figure 2:
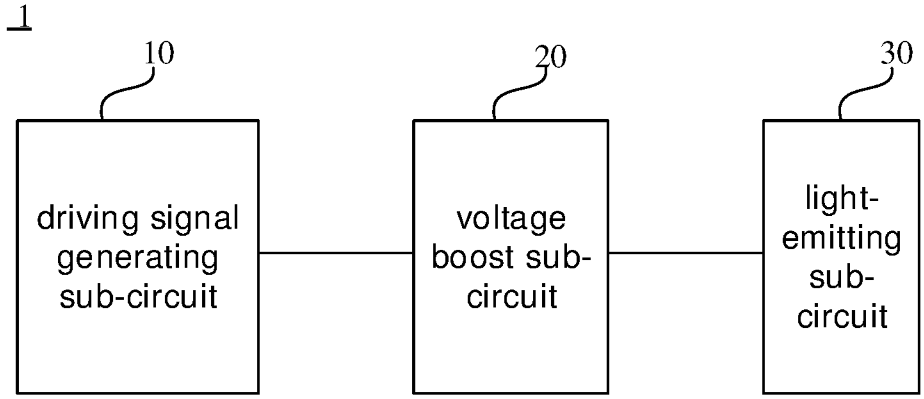
FIG. 2 is a schematic diagram showing a structure of a pixel circuit provided in some embodiments of the present disclosure.

Some embodiments of the present disclosure provide a pixel circuit. As shown in FIG. 2, the pixel circuit 1 includes a driving signal generating sub-circuit 10, a voltage boost sub-circuit 20 electrically connected to the driving signal generating sub-circuit 10, and a light-emitting sub-circuit 30 electrically connected to the voltage boost sub-circuit 20.

The driving signal generating sub-circuit 10 is configured to generate and output an initial driving signal.

It will be noted that a structure of the driving signal generating sub-circuit 10 is not limited herein, as long as the driving signal generating sub-circuit 10 is capable of generating the initial driving signal. Therefore, a circuit that may transmit an initial driving signal to an anode of the light-emitting sub-circuit 30 may be used as the driving signal generating sub-circuit 10.

The voltage boost sub-circuit 20 is configured to receive the initial driving signal output by the driving signal generating sub-circuit 10, amplify the initial driving signal to generate a target driving signal, and output the target driving signal.

The light-emitting sub-circuit 30 is configured to receive the target driving signal output by the voltage boost sub-circuit 20, and be driven to emit light by the target driving signal.

In this embodiment, the voltage boost sub-circuit 20 is added to the pixel circuit 1. The voltage boost sub-circuit 20 may amplify the initial driving signal generated by the driving signal generating sub-circuit 10, so that the target driving signal transmitted to the light-emitting sub-circuit 30 is greater than the initial driving signal generated by the driving signal generating sub-circuit 10. In this way, a driving current of the light-emitting sub-circuit 30 may be increased, thereby increasing the luminance of the light-emitting sub-circuit 30.

In addition, the voltage boost sub-circuit 20 amplifies the initial driving signal output by the driving signal generating sub-circuit 10. Therefore, an influence of voltage loss caused by the body effect of the driving transistor in the driving signal generating sub-circuit 10 on an effect of enhancing the luminance of the light-emitting sub-circuit 30 may be negligible.

Figure 3:
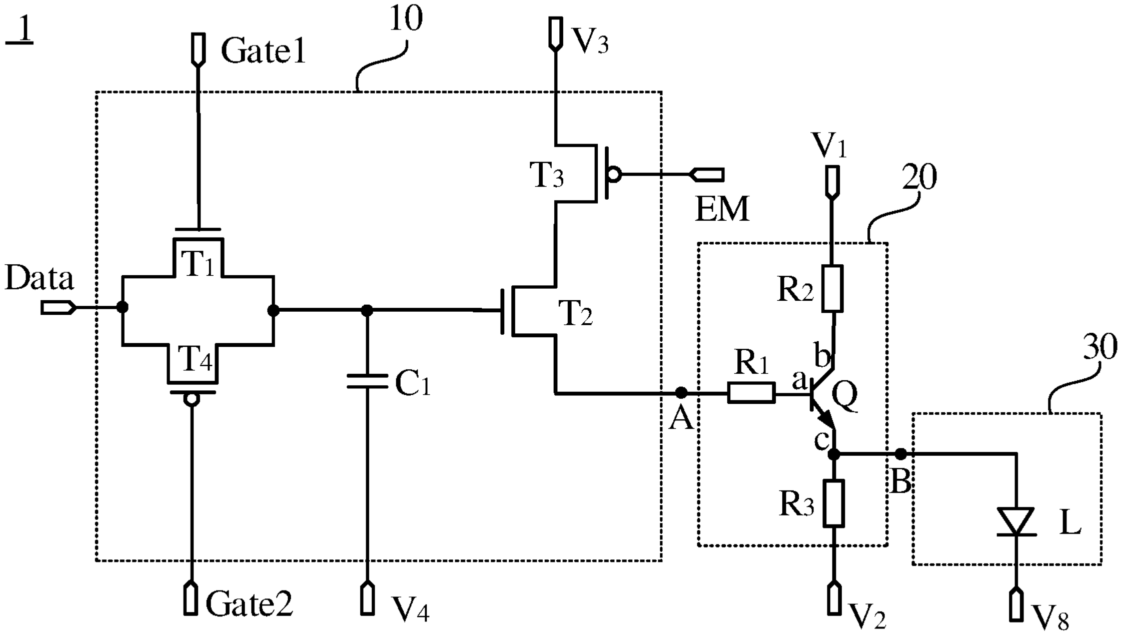
FIG. 3 is a schematic diagram showing a structure of each sub-circuit in the pixel circuit shown in FIG. 2 provided in some embodiments of the present disclosure.

In some embodiments, as shown in FIG. 3, the voltage boost sub-circuit 20 includes a first resistor $R_1$, a second resistor $R_2$, a third resistor $R_3$, and a bipolar junction transistor Q.

The bipolar junction transistor Q has a base a, a collector b, and an emitter c. The first resistor $R_1$ is electrically connected between the driving signal generating sub-circuit 10 and the base a of the bipolar junction transistor Q. The second resistor $R_2$ is electrically connected between a first voltage terminal $V_1$ and the collector b of the bipolar junction transistor Q. The third resistor $R_3$ is electrically connected between a second voltage terminal $V_2$ and the emitter c of the bipolar junction transistor Q. The emitter c of the bipolar junction transistor Q is further electrically connected to the light-emitting sub-circuit 30.

A working principle of the voltage boost sub-circuit 20 is as follow: when the initial driving signal $V_{in}$, generated by the driving signal generating sub-circuit 10 is transmitted to an output terminal A of the driving signal generating sub-circuit 10 (i.e., an input terminal of the voltage boost sub-circuit 20), and when the bipolar junction transistor Q meets an amplification condition, a current of the base a of the bipolar junction transistor Q is $I_B$, and a current of the emitter c of the bipolar junction transistor Q is $(1+\beta)\times I_B$. In this case, a target driving signal output from an output terminal B of the voltage boost sub-circuit 20 (i.e., an input terminal of the light-emitting sub-circuit 30) is $$V_{out} = \frac{V_{in} - U_{be}}{R_b + R_e}(1+\beta)\times R_e,$$

thereby achieving a voltage boosting of the driving signal.

Where, β is a magnification of the bipolar junction transistor Q, β is greater than 1, $U_{be}$ is a turn-on voltage (that is, a voltage between the base a and the emitter c) of the bipolar junction transistor Q, $R_b$ is a resistance value of the first resistor $R_1$, and $R_e$ is a resistance value of the third resistor $R_3$.

The amplification condition of the bipolar junction transistor is that a base-emitter junction is forward biased and a collector-base junction is reverse biased. Therefore, resistance values of the first resistor $R_1$, the second resistor $R_2$, and the third resistor $R_3$ are selected to meet the requirements that the base-emitter junction is forward biased and the collector-base junction is reverse biased after the initial driving voltage $V_{in}$ is input to the base. For example, the resistance value of the first resistor R1 is 1 KΩ, the resistance value of the second resistor R2 is 2 KΩ, the resistance value of the third resistor R3 is 20Ω, and β is 100. In this way, the bipolar junction transistor Q may be made to work in a linear amplification region (which satisfies the amplification condition). In this case, if a data voltage signal written by the data voltage terminal Data is 5 V, and the initial driving signal $V_{in}$ is 4.5 V, the target driving signal $V_{out}$, output by the voltage boost circuit 20 is 6.6 V, which means a voltage increase of 47%.

For example, the bipolar junction transistor Q is a silicon bipolar junction transistor or a germanium bipolar junction transistor. In a case where the bipolar junction transistor Q in the pixel circuit is the silicon bipolar junction transistor, space occupied by the bipolar junction transistor Q may be reduced, thereby reducing space occupied by an entire pixel circuit.

There may be various structures of the driving signal generating sub-circuit 10, including, but not limited to multiple embodiments shown below.

In some embodiments, as shown in FIG. 3, the driving signal generating sub-circuit 10 includes a first transistor $T_1$, a second transistor $T_2$, a third transistor $T_3$, and a first storage capacitor $C_1$.

A control electrode of the first transistor $T_1$ is electrically connected to a first scanning signal terminal Gate1, a first electrode of the first transistor $T_1$ is electrically connected to the data voltage terminal Data, and a second electrode of the first transistor $T_1$ is electrically connected to a first terminal of the first storage capacitor $C_1$.

A control electrode of the second transistor $T_2$ is electrically connected to the second electrode of the first transistor $T_1$ and the first terminal of the first storage capacitor $C_1$, a first electrode of the second transistor $T_2$ is electrically connected to a second electrode of the third transistor $T_3$, and a second electrode of the second transistor $T_2$ is electrically connected to the voltage boost sub-circuit 20.

A control electrode of the third transistor $T_3$ is electrically connected to an enabling signal terminal EM, and a first electrode of the third transistor $T_3$ is electrically connected to a third voltage terminal $V_3$.

A second terminal of the first storage capacitor $C_1$ is electrically connected to a fourth voltage terminal $V_4$.

In this embodiment, the first transistor $T_1$ transmits a signal from the data voltage terminal Data to the first storage capacitor $C_1$ under control of the first scanning signal terminal Gate1. The first storage capacitor $C_1$ is used to ensure that the second transistor $T_2$ (used as a driving transistor) works in a saturation region. Under control of the enabling signal terminal EM, the third transistor $T_3$ transmits a voltage of the third voltage terminal $V_3$ to the second transistor $T_2$, so that the second transistor $T_2$ may output the initial driving signal via its second terminal, thereby inputting the initial driving signal to the voltage boost sub-circuit 20.

For example, the driving signal generating sub-circuit 10 further includes a plurality of switching transistors connected with the first transistor $T_1$ in parallel, a plurality of switching transistors connected with the second transistor $T_2$ in parallel, and a plurality of switching transistors connected with the third transistor $T_3$ in parallel.

On this basis, in some embodiments, as shown in FIG. 3, the driving signal generating sub-circuit 10 further includes a fourth transistor $T_4$. A control electrode of the fourth transistor $T_4$ is electrically connected to a second scanning signal terminal Gate2, a first electrode of the fourth transistor $T_4$ is electrically connected to the data voltage terminal Data, and a second electrode of the fourth transistor $T_4$ is electrically connected to the first terminal of the first storage capacitor $C_1$. In this way, under control of the first scanning signal terminal Gate1, the first transistor $T_1$ transmits a signal from the data voltage terminal Data to the first storage capacitor $C_1$. And under control of the second scanning signal terminal Gate2, the fourth transistor $T_4$ transmits a signal from the data voltage terminal Data to the first storage capacitor $C_1$. For example, as shown in FIG. 3, one of the first transistor $T_1$ and the fourth transistor $T_4$ is an N-type transistor, while another is a P-type transistor. The N-type transistor can effectively transmit a low voltage, and the P-type transistor can effectively transmit a high voltage. Therefore, by using both the first transistor $T_1$ and the fourth transistor $T_4$ to transmit the signal from the data voltage terminal Data, the signal from the data voltage terminal Data may be stably and reliably transmitted to the first storage capacitor $C_1$. It will be noted that the low voltage and the high voltage here merely indicate a relative magnitude relationship between voltages of input signals.

For example, the driving signal generating sub-circuit 10 further includes a plurality of switching transistors connected with the fourth transistor $T_4$ in parallel.

Figure 4:
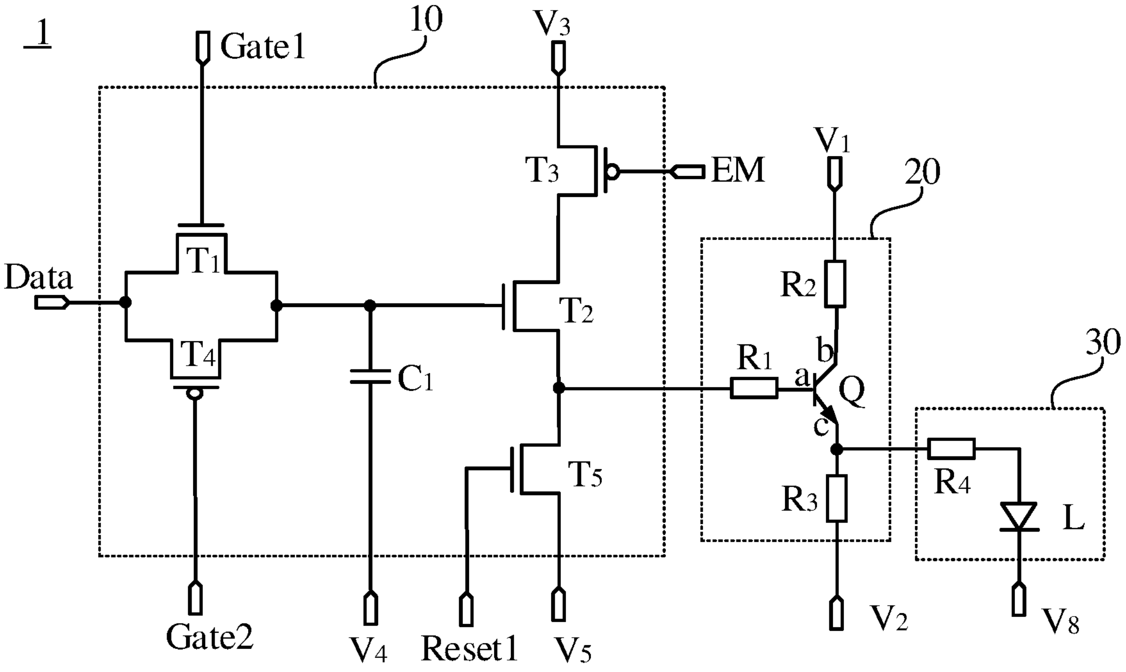
FIG. 4 is a schematic diagram showing another structure of each sub-circuit in the pixel circuit shown in FIG. 2 provided in some embodiments of the present disclosure.

In some embodiments, as shown in FIG. 4, the driving signal generating sub-circuit 10 further includes a fifth transistor $T_5$. A control electrode of the fifth transistor $T_5$ is electrically connected to a first reset signal terminal Reset1, a first electrode of the fifth transistor $T_5$ is electrically connected to a fifth voltage terminal $V_5$, and a second electrode of the fifth transistor $T_5$ is electrically connected to the second electrode of the second transistor $T_2$ and the voltage boost sub-circuit 20. In this way, the light-emitting sub-circuit 30 may be initialized before being driven to emit light, thereby reducing an influence of threshold voltage drift on light-emitting effect.

For example, the driving signal generating sub-circuit 10 further includes a plurality of switching transistors connected with the fifth transistor $T_5$ in parallel.

For example, as shown in FIG. 4, one terminal of the first resistor $R_1$ is connected to the second electrode of the second transistor $T_2$ and the second electrode of the fifth transistor $T_5$, and another terminal of the first resistor $R_1$ is connected to the base of the bipolar junction transistor Q.

For example, as shown in FIG. 4, in a case where the voltage boost sub-circuit 20 is electrically connected to the first voltage terminal $V_1$, the third voltage terminal $V_3$ is configured to output a voltage signal that is the same as a voltage signal output from the first voltage terminal $V_1$. With this design, a voltage signal terminal of a same power supply is used to output voltage signals to the first voltage terminal $V_1$ and the third voltage terminal $V_3$, which simplifies a circuit structure, reduces difficulty of manufacturing the pixel circuit, and improves stability and reliability of the pixel circuit.

Figure 5:
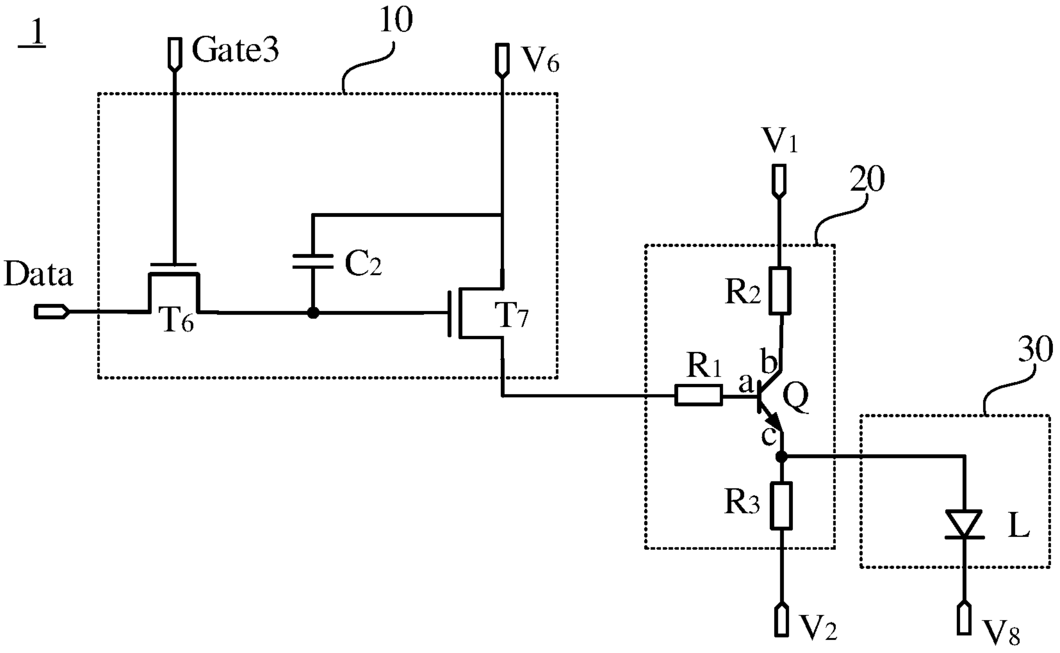
FIG. 5 is a schematic diagram showing yet another structure of each sub-circuit in the pixel circuit shown in FIG. 2 provided in some embodiments of the present disclosure.

In some other embodiments, as shown in FIG. 5, the driving signal generating sub-circuit 10 includes a sixth transistor $T_6$, a seventh transistor $T_7$, and a second storage capacitor $C_2$.

A control electrode of the sixth transistor $T_6$ is electrically connected to a third scanning signal terminal Gate3, a first electrode of the sixth transistor $T_6$ is electrically connected to the data voltage terminal Data, and a second electrode of the sixth transistor $T_6$ is electrically connected to a first terminal of the second storage capacitor $C_2$.

A control electrode of the seventh transistor $T_7$ is electrically connected to the second electrode of the sixth transistor $T_6$ and the first terminal of the second storage capacitor $C_2$, a first electrode of the seventh transistor $T_7$ is electrically connected to a second terminal of the second storage capacitor $C_2$ and a sixth voltage terminal $V_6$, and a second electrode of the seventh transistor $T_7$ is electrically connected to the voltage boost sub-circuit 20.

In this embodiment, the sixth transistor $T_6$ transmits a signal from the data voltage terminal Data to the second storage capacitor $C_2$ under control of the third scanning signal terminal Gate3. The second storage capacitor $C_2$ is used to ensure that the seventh transistor $T_7$ (used as a driving transistor) works in a saturation region. In this case, a voltage from the sixth voltage terminal $V_6$ is transmitted to the seventh transistor $T_7$, so that the seventh transistor $T_7$ may output the initial driving signal via its second electrode, thereby inputting the initial driving signal to the voltage boost sub-circuit 20.

For example, the driving signal generating sub-circuit 10 further includes a plurality of switching transistors connected with the sixth transistor $T_6$ in parallel and a plurality of switching transistors connected with the seventh transistor $T_7$ in parallel.

Figure 6:
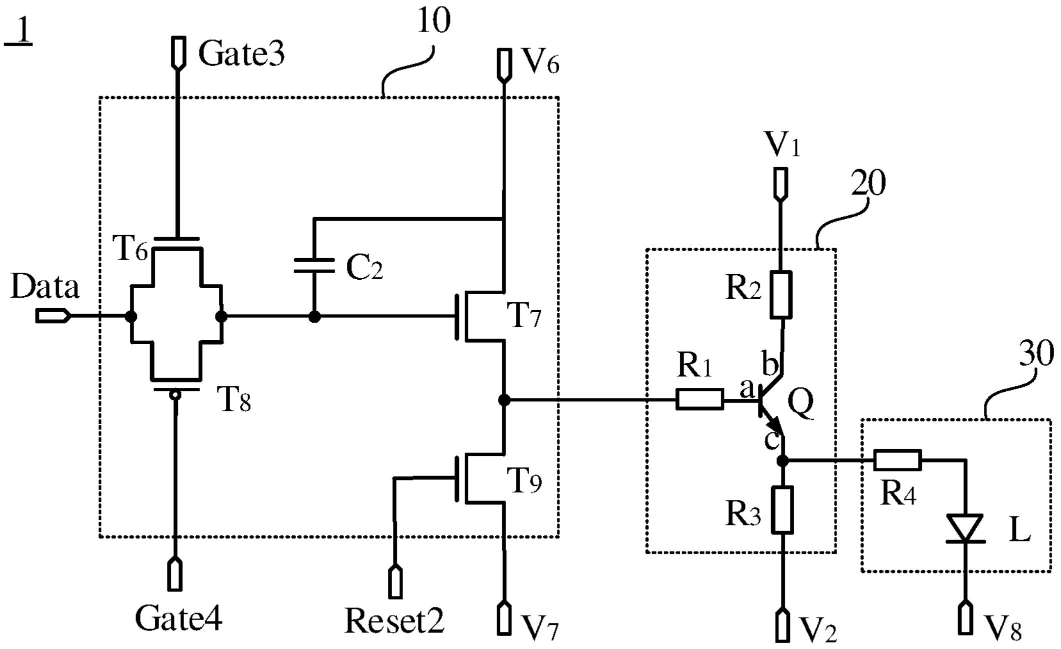
FIG. 6 is a schematic diagram showing yet another structure of each sub-circuit in the pixel circuit shown in FIG. 2 provided in some embodiments of the present disclosure.

On this basis, in some embodiments, as shown in FIG. 6, the driving signal generating sub-circuit 10 further includes an eighth transistor $T_8$. A control electrode of the eighth transistor $T_8$ is electrically connected to a fourth scanning signal terminal Gate4, a first electrode of the eighth transistor $T_8$ is electrically connected to the data voltage terminal Data, and a second electrode of the eighth transistor $T_8$ is electrically connected to the control electrode of the seventh transistor $T_7$ and the first terminal of the second storage capacitor $C_2$. In this way, under control of the third scanning signal terminal Gate3, the sixth transistor $T_6$ transmits a signal from the data voltage terminal Data to the second storage capacitor $C_2$. Under control of the fourth scanning signal terminal Gate4, the eighth transistor $T_8$ transmits a signal from the data voltage terminal Data to the second storage capacitor $C_2$. In some examples, as shown in FIG. 6, one of the sixth transistor $T_6$ and the eighth transistor $T_8$ is an N-type transistor, while another is a P-type transistor. The N-type transistor can effectively transmit a low voltage, and the P-type transistor can effectively transmit a high voltage. Therefore, by using both the sixth transistor $T_6$ and the eighth transistor $T_8$ to transmit the signal from the data voltage terminal Data, the signal from the data voltage terminal Data may be stably and reliably transmitted to the second storage capacitor $C_2$. It will be noted that the low voltage and the high voltage here merely indicate a relative magnitude relationship between voltages of input signals.

For example, the driving signal generating sub-circuit 10 further includes a plurality of switching transistors connected with the eighth transistor $T_8$ in parallel.

In some embodiments, as shown in FIG. 6, the driving signal generating sub-circuit 10 further includes a ninth transistor $T_9$. A control electrode of the ninth transistor $T_9$ is electrically connected to a second reset signal terminal Reset2, a first electrode of the ninth transistor $T_9$ is electrically connected to a seventh voltage terminal $V_7$, and a second electrode of the ninth transistor $T_9$ is electrically connected to the second electrode of the second transistor $T_7$ and the voltage boost sub-circuit 20. In this way, the light-emitting sub-circuit 30 may be initialized before being driven to emit light, thereby reducing the influence of threshold voltage drift on light-emitting effect.

For example, the driving signal generating sub-circuit 10 further includes a plurality of switching transistors connected with the ninth transistor $T_9$ in parallel.

For example, as shown in FIG. 6, one terminal of the first resistor $R_1$ is connected to the second electrode of the seventh transistor $T_7$ and the second electrode of the ninth transistor $T_9$, and another terminal of the first resistor $R_1$ is connected to the base of the bipolar junction transistor Q.

For example, in a case where the voltage boost sub-circuit 20 is electrically connected to the first voltage terminal $V_1$, the sixth voltage terminal $V_6$ is configured to output a voltage signal that is the same as a voltage signal output from the first voltage terminal $V_1$. With this design, a same power supply may be used to output same voltage signals to the first voltage terminal $V_1$ and the sixth voltage terminal $V_6$, which simplifies a circuit structure, reduces difficulty of manufacturing the pixel circuit, and improves stability and reliability of the pixel circuit.

There are various structures of the light-emitting sub-circuit 30. In some embodiments, as shown in FIGS. 3 to 6, the light-emitting sub-circuit 30 includes a self-emitting-light device L. An anode of the self-emitting-light device L is electrically connected to the voltage boost sub-circuit 20 (for example, the anode of the self-emitting-light device L is connected to the emitter of the bipolar junction transistor Q), and a cathode of the self-emitting-light device L is electrically connected to an eighth voltage terminal $V_8$. With this design, the target driving signal output by the voltage boost sub-circuit 20 and a signal output from the eighth voltage terminal $V_8$ may be used to drive the self-emitting-light device L to emit light. Since a voltage of the target driving signal is greater than a voltage of the initial driving signal generated by the driving signal generating sub-circuit 10, luminance of the self-emitting-light device is increased.

For example, the self-emitting-light device L is an OLED device.

In some embodiments, as shown in FIGS. 4 and 6, the light-emitting sub-circuit 30 further includes a fourth resistor $R_4$. The fourth resistor $R_4$ is electrically connected between the anode of the self-emitting-light device L and the voltage boost sub-circuit 20. For example, one terminal of the fourth resistor $R_4$ is connected to the emitter of the bipolar junction transistor Q, and another terminal of the fourth resistor $R_4$ is connected to the anode of the light-emitting-light device L. With this design, in a case where a plurality of pixel circuits are applied to a display apparatus, if one pixel circuit becomes short-circuited, the fourth resistor $R_4$ in the pixel circuit may reduce the short-circuit current thereon, thereby preventing a short circuit from occurring in pixel circuits around the pixel circuit.

On the basis of descriptions of the driving signal generating sub-circuit 10, the voltage boost sub-circuit 20, and the light-emitting sub-circuit 30 in the above embodiments, a driving process of the pixel circuit will be described in detail below with reference to FIGS. 4 and 7.

It will be noted that, types of transistors included in the pixel circuit are not limited in some embodiments of the present disclosure. The first transistor $T_1$ to the ninth transistor $T_9$ may be N-type transistors or P-type transistors. In some embodiments, the third transistor $T_3$ and the fourth transistor $T_4$ included in the pixel circuit shown in FIG. 4 are P-type transistors, and all the other transistors are N-type transistors except the third transistor $T_3$ and the fourth transistor $T_4$. The pixel circuit shown in FIG. 4 is taken as an example for description below.

In addition, in some embodiments, the control electrodes of the transistors are gates. The first electrodes of the transistors are drains and the second electrodes of the transistors are sources; or, the first electrodes of the transistors are sources and the second electrodes of the transistors are drains, which is not limited in the present disclosure.

The transistors in the pixel circuit may be provided as enhancement-mode transistors or depletion-mode transistors according to different conductivity manners of the transistors, which is not limited in the present disclosure.

Some embodiments of the present disclosure is described by taking an example in which an eighth voltage signal output via the eighth voltage terminal $V_8$ is a low-level signal, a fourth voltage signal output via the fourth voltage terminal $V_4$ is a low-level signal, a first voltage signal output via the first voltage terminal $V_1$ is a high-level signal, and the second voltage terminal $V_2$ is grounded. The high-level and the low-level here merely indicate a relative magnitude relationship between the voltages of the input signals.

The driving process of the pixel circuit shown in FIG. 4 includes three periods: an initial driving signal generation period, a target driving signal generation period, and a light-emitting period.

Figure 7:
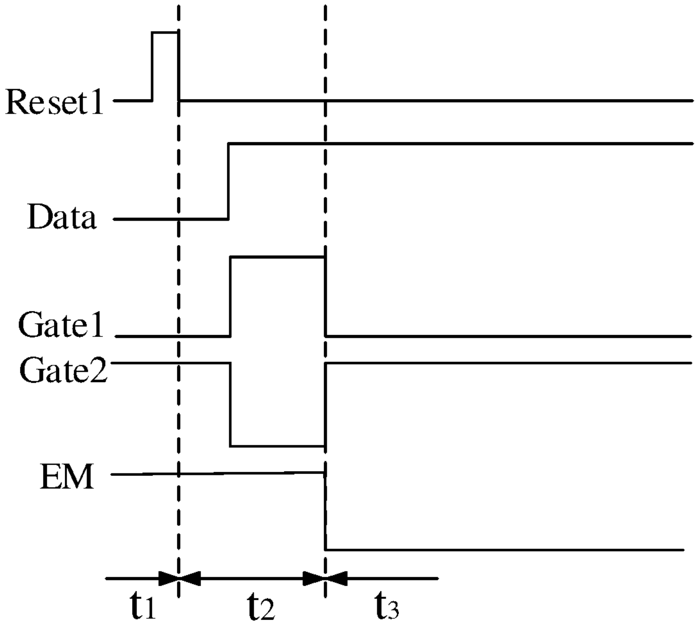
FIG. 7 is a timing diagram of driving the pixel circuit shown in FIG. 4 provided in some embodiments of the present disclosure.

Initial Driving Signal Generation Period:

In this period, timings of signal terminals are shown in FIG. 7. This period includes a first period $t_1$, a second period $t_2$ and a third period $t_3$.

In the first period $t_1$, a high-level initial signal is input via the initial signal terminal Reset1 to control the fifth transistor $T_5$ to be turned on. The fifth transistor $T_5$ transmits a signal from the fifth voltage terminal $V_5$ to the voltage boost sub-circuit 20. Then the signal is transmitted to the light-emitting sub-circuit 30 via the voltage boost sub-circuit 20 to initialize the anode of the self-emitting-light device L.

Those skilled in the art should understand that the signal transmitted from the fifth voltage terminal $V_5$ may be very small, or may be 0 V. Moreover, the signal from the fifth voltage terminal $V_5$ may be amplified and transmitted by the voltage boost sub-circuit 20 to the light-emitting sub-circuit 30.

In the second period $t_2$, a high-level first scanning signal is input via the first scanning signal terminal Gate1 to control the first transistor $T_1$ to be turned on, and the first transistor $T_1$ transmits a data voltage signal output via the data voltage terminal Data to the first storage capacitor $C_1$ and the control electrode of the second transistor $T_2$.

In this case, a low-level second scanning signal is input via the second scanning signal terminal Gate2 to control the fourth transistor $T_4$ to be turned on, and the fourth transistor $T_4$ transmits the data voltage signal output via the data voltage terminal Data to the first storage capacitor $C_1$ and the control electrode of the second transistor $T_2$.

In the third period $T_3$, the signal input via the first scanning signal terminal Gate1 is changed to a low-level signal, and the signal input via the second scanning signal terminal Gate2 is changed to a high-level signal, so as to control the first transistor $T_1$ and the fourth transistor $T_4$ to be turned off. Here, the second transistor $T_2$ works in a saturation region. A low-level enabling signal is input via the enabling signal terminal EM to control the third transistor $T_3$ to be turned on, and the third transistor $T_3$ transmits a third voltage signal output via the third voltage terminal $V_3$ to the second transistor $T_2$, so that the second transistor $T_2$ generates and outputs an initial driving signal to the voltage boost sub-circuit 20.

In this case, the data voltage signal may be continuously input via the data voltage terminal Data, or may be stopped from being input.

Figure 8:
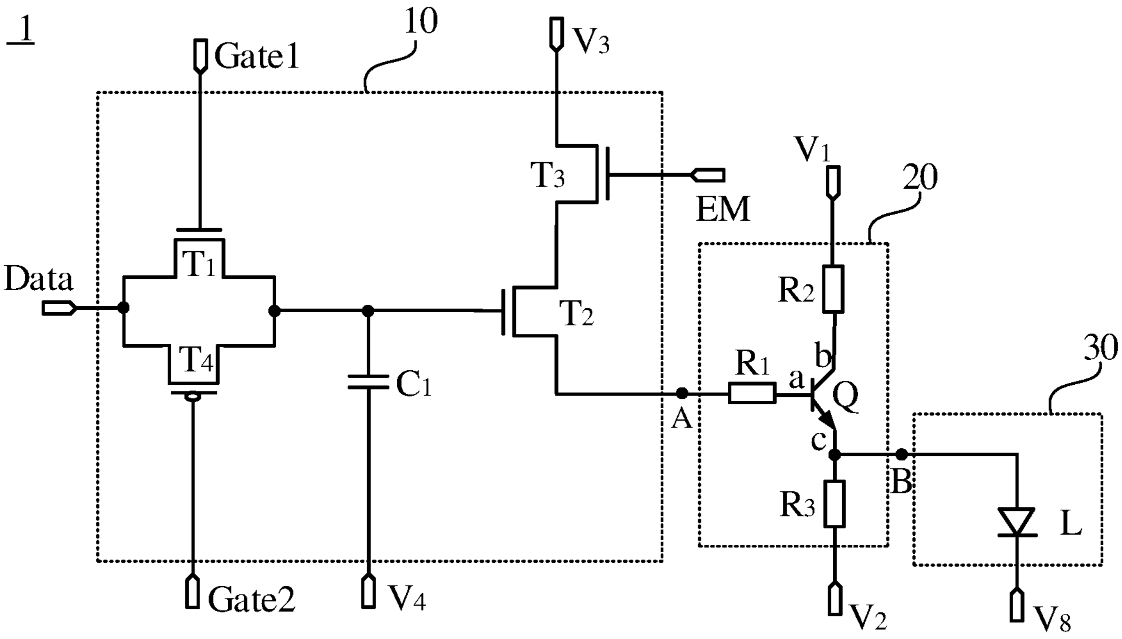
FIG. 8 is a schematic diagram showing yet another structure of each sub-circuit in the pixel circuit shown in FIG. 2 provided in some embodiments of the present disclosure.
Figure 9:
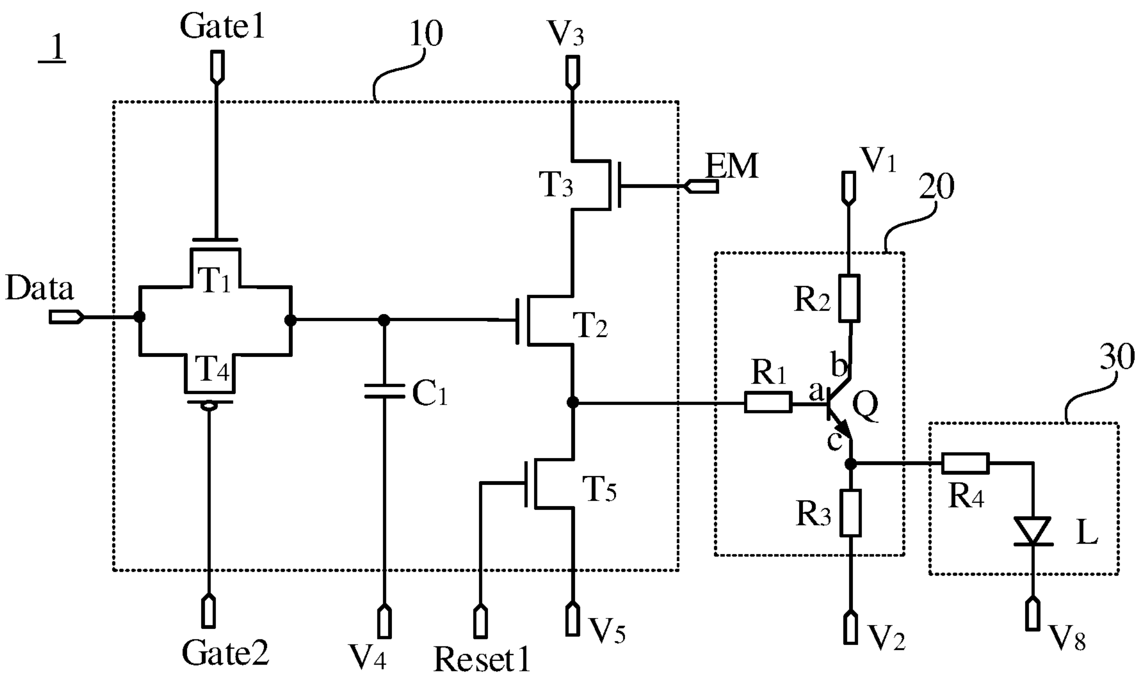
FIG. 9 is a schematic diagram showing yet another structure of each sub-circuit in the pixel circuit shown in FIG. 2 provided in some embodiments of the present disclosure.

In some embodiments, as shown in FIGS. 8 and 9, the third transistor $T_3$ in the pixel circuit 1 may be replaced with an N-type transistor from a P-type transistor. For example, compared with the third transistor $T_3$ of the pixel circuit in FIG. 3, the third transistor $T_3$ of the pixel circuit in FIG. 8 is replaced with an N-type transistor from a P-type transistor. Compared with the third transistor $T_3$ of the pixel circuit in FIG. 4, the third transistor $T_3$ of the pixel circuit in FIG. 9 is replaced with an N-type transistor from a P-type transistor.

Figure 10:
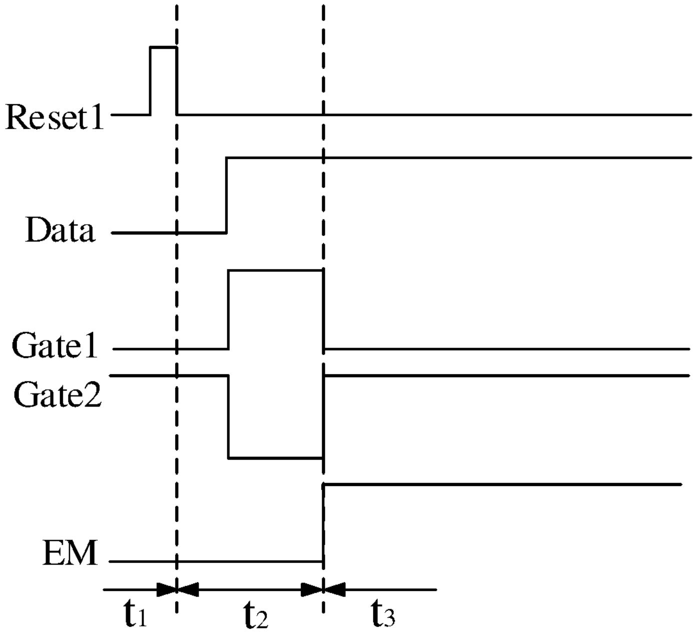
FIG. 10 is a timing diagram of driving the pixel circuit shown in FIG. 9 provided in some embodiments of the present disclosure.

In this case, on the basis of the pixel circuit 1 shown in FIG. 9, the third period $t_3$ of the initial signal generation period changes. As shown in FIG. 10, in the third period $T_3$, a high-level enabling signal is required to be input via the enabling signal terminal EM to control the third transistor $T_3$ to be turned on, and then the third transistor $T_3$ transmits the third voltage signal output via the third voltage terminal $V_3$ to the second transistor $T_2$, so that the second transistor $T_2$ generates and outputs an initial driving signal to the voltage boost sub-circuit 20.

In some embodiments, a magnitude of the initial driving signal may be adjusted by adjusting a duty cycle of the enabling signal input from the enabling signal terminal EM, so as to adjust luminance and contrast of the self-emitting-light device L.

In the target driving signal generation period, the voltage boost sub-circuit 20 amplifies the initial driving signal received to generate the target driving signal, and outputs the target driving signal to the light-emitting sub-circuit 30. The target driving signal which has been amplified is:

$$V_{out} = \frac{V_{in} - U_{be}}{R_b + R_e}(1+\beta) \times R_e.$$

In the light-emitting period, the self-emitting-light device L is driven by the target driving signal and the eighth voltage signal output via the eighth voltage terminal $V_8$ to emit light.

The third transistor $T_3$ transmits a signal provided by the third voltage terminal $V_3$ to the second transistor $T_2$ under control of the enabling signal output via the enabling signal terminal EM, so as to provide a voltage for the anode of the self-emitting-light device L. The signal provided by the eighth voltage terminal $V_8$ provides a voltage for the cathode of the self-emitting-light device L. A driving voltage applied to the self-emitting-light device L may be adjusted by adjusting the signal from the eighth voltage terminal $V_8$, so as to adjust the luminance and the contrast of the self-emitting-light device L.

Figure 11:
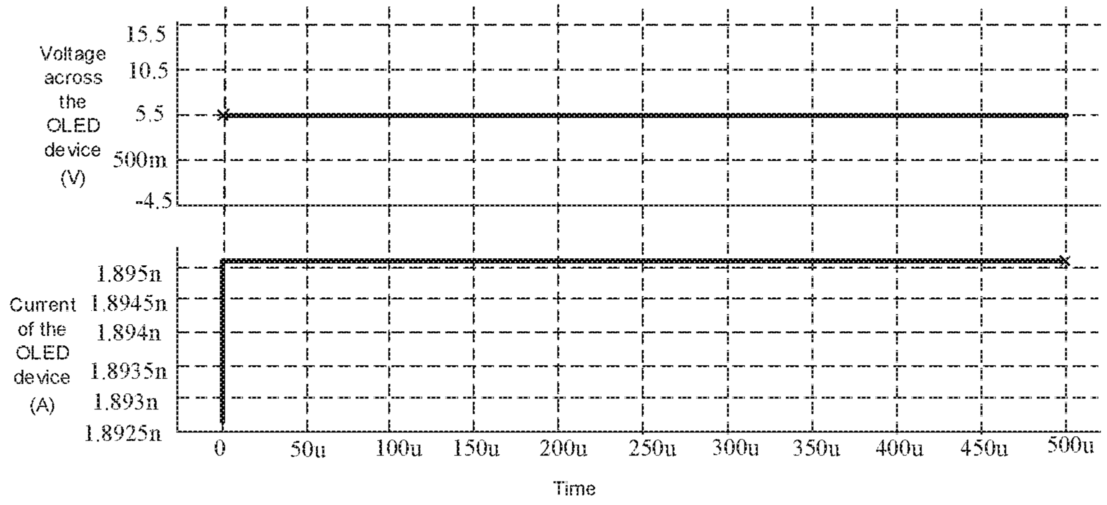
FIG. 11 is a diagram showing a simulated effect of the pixel circuit shown in FIG. 1.

FIG. 11 shows a light-emitting current of the OLED light-emitting device in the pixel circuit shown in FIG. 1, and the light-emitting current is simulated by HSPICE (which is a high precision circuit simulation). A voltage input to the anode of the OLED light-emitting device is 4.5 V, and a voltage input to the cathode of the OLED light-emitting device via the voltage terminal $V_a$ may be adjustable. In a case where the voltage input to the cathode of the OLED light-emitting device via the voltage terminal $V_a$ is −1 V, as shown in FIG. 8, a voltage across the OLED light-emitting device is 4.5 V−(−1 V)=5.5 V, and a current flowing through the OLED light-emitting device is 1.90 nA.

Figure 12:
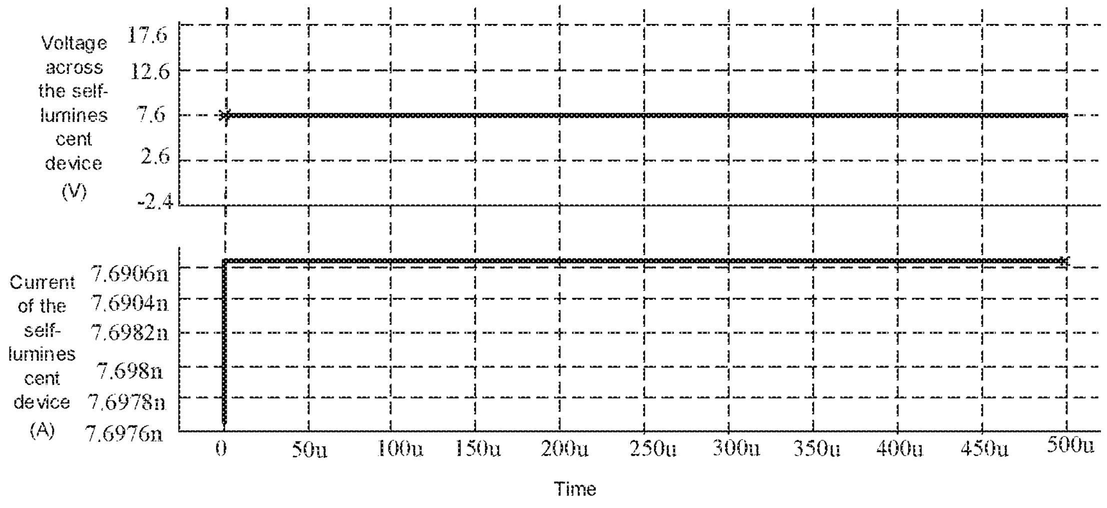
FIG. 12 is a diagram showing a simulated effect of the pixel circuit shown in FIG. 4 provided in some embodiments of the present disclosure.

FIG. 12 shows a light-emitting current of the self-emitting-light device (i.e., the OLED light-emitting device) in the pixel circuit shown in FIG. 4, and the light-emitting current is simulated by HSPICE. After being amplified by the voltage boost circuit 20, the voltage input to the anode of the self-emitting-light device L is 6.6 V. The voltage input to the cathode of the self-emitting-light device L via the voltage terminal $V_8$ may be adjustable. In a case where the voltage input to the cathode of the self-emitting-light device L via the voltage terminal $V_8$ is −1 V, as shown in FIG. 12, a voltage across the self-emitting-light device L is 6.6 V−(−1 V)=7.6 V, and a current flowing through the self-emitting-light device L is 7.70 nA, which indicates a 305% increase in the current. Therefore, the luminance of the self-emitting-light device L is greatly improved.

Figure 13:
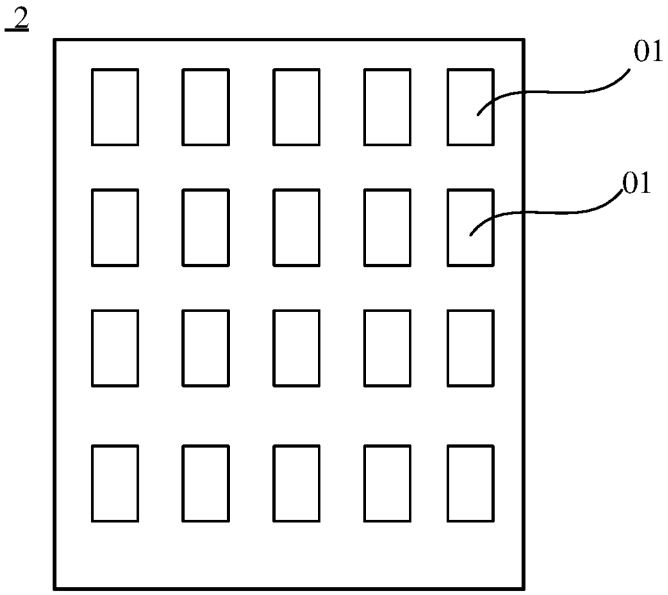
FIG. 13 is a schematic diagram showing a structure of a display apparatus provided in some embodiments of the present disclosure.

Some embodiments of the present disclosure provide a display apparatus. As shown in FIG. 13, the display apparatus 2 includes a plurality of pixel circuits. Each pixel circuit is the pixel circuit provided in any one of the foregoing embodiments. For example, as shown in FIG. 13, the display apparatus 2 includes a plurality of pixel units 01. The plurality of pixel units 01 are arranged in an array. Each pixel unit 01 includes any one of pixel circuits described above.

In this embodiment, each pixel circuit 1 includes the driving signal generating sub-circuit 10, the voltage boost sub-circuit 20, and the light-emitting sub-circuit 30. The light-emitting sub-circuit 30 includes the self-emitting-light device L. Since the voltage boost sub-circuit 20 is added to the pixel circuit 1, and the voltage boost sub-circuit 20 may amplify the initial driving signal generated by the driving signal generating sub-circuit 10, the target driving signal transmitted to the light-emitting sub-circuit 30 is greater than the initial driving signal generated by the driving signal generating sub-circuit 10. In this way, a driving current of the self-emitting-light device L in the light-emitting sub-circuit 30 may be increased, and the luminance of the self-emitting-light device L may be increased, thereby achieving an effect of enhancing brightness of the entire display apparatus 2.

For example, the above display apparatus may be any product or component having a display function, such as an OLED display, a digital photo frame, a mobile phone, a tablet computer or a navigator.

Figure 14:
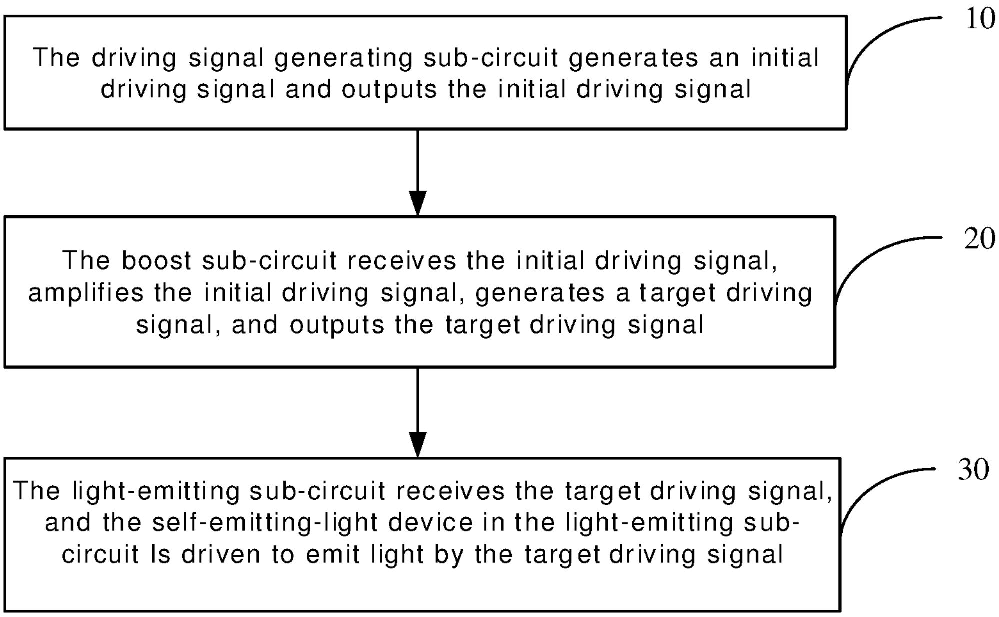
FIG. 14 is a schematic flow chart of a driving method of a pixel circuit provided in some embodiments of the present disclosure.

Some embodiments of the present disclosure provide a driving method of the pixel circuit. As shown in FIG. 14, the driving method includes the following steps.

In step 10, the driving signal generating sub-circuit 10 generates an initial driving signal and outputs the initial driving signal.

In some embodiments, as shown in FIG. 4, the driving signal generating sub-circuit includes the first transistor $T_1$, the second transistor $T_2$, the third transistor $T_3$, the fourth transistor $T_4$ and the first storage capacitor $C_1$.

Figure 15:
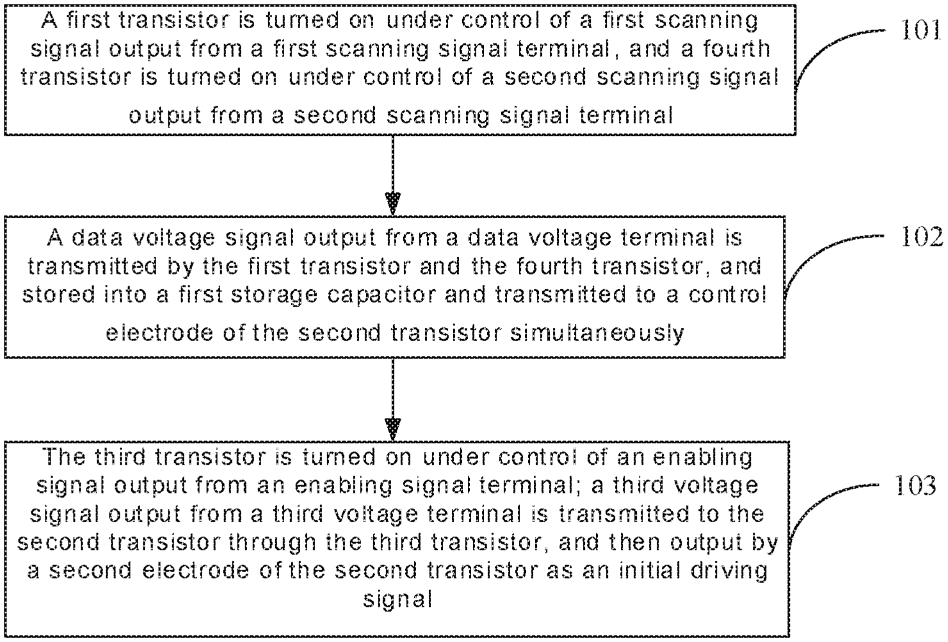
FIG. 15 is a schematic flow chart showing how a driving signal generating sub-circuit generates an initial driving signal provided in some embodiments of the present disclosure.

On this basis, as shown in FIG. 15, the step 10 includes the following steps.

In step 101, the first transistor $T_1$ is turned on under control of the first scanning signal output via the first scanning signal terminal Gate1, and the fourth transistor $T_4$ is turned on under control of the second scanning signal output via the second scanning signal terminal Gate2.

In step 102, the first transistor $T_1$ and the fourth transistor $T_4$ transmit the data voltage signal output via the data voltage terminal Data to both the first storage capacitor $C_1$ and the control electrode of the second transistor $T_2$, and the first storage capacitor $C_1$ stores the data voltage signal.

In step 103, the third transistor $T_3$ is turned on under control of the enabling signal output via the enabling signal terminal EM and transmits the third voltage signal output via the third voltage terminal $V_3$ to the second transistor $T_2$, and the second transistor $T_2$ outputs the third voltage signal via its second electrode as an initial driving signal.

In step 20, the voltage boost sub-circuit receives the initial driving signal, amplifies the initial driving signal to generate the target driving signal, and outputs the target driving signal.

In this step, the driving signal generating sub-circuit 10 transmits the initial driving signal to the voltage boost sub-circuit 20. In a case where the voltage boost sub-circuit 20 is turned on, the initial driving signal is amplified, and the target driving signal which has been amplified is $$V_{out} = \frac{V_{in} - U_{be}}{R_b + R_e}(1 + \beta) \times R_e.$$

In step 30, the light-emitting sub-circuit 30 receives the target driving signal, and the self-emitting-light device in the light-emitting sub-circuit emits light under driving of the target driving signal.

In the driving method provided by some embodiments of the present disclosure, the voltage boost sub-circuit 20 may be controlled to amplify the initial driving signal generated by the driving signal generating sub-circuit 10, so that the target driving signal transmitted to the light-emitting sub-circuit 30 is greater than the initial driving signal generated by the driving signal generating sub-circuit 10. In this way, the driving current of the self-emitting-light device in the light-emitting sub-circuit 30 may be increased, and the luminance of the self-emitting-light device may be increased, thereby enhancing the brightness of the entire display apparatus. The foregoing descriptions are merely specific implementation manners of the present disclosure, but the protection scope of the present disclosure is not limited thereto, and the protection scope of the present disclosure shall be subject to the protection scope of the claims.

What is claimed is:

1. A pixel circuit, comprising:

a driving signal generating sub-circuit configured to generate and output an initial driving signal;

a voltage boost sub-circuit electrically connected to the driving signal generating sub-circuit, and configured to receive the initial driving signal, amplify the initial driving signal to generate a target driving signal, and output the target driving signal; and a light-emitting sub-circuit electrically connected to the voltage boost sub-circuit, and configured to receive the target driving signal and be driven by the target driving signal to emit light, wherein the driving signal generating sub-circuit includes a first transistor, a second transistor, a third transistor, a fifth transistor and a first storage capacitor;

a control electrode of the first transistor is electrically connected to a first scanning signal terminal, a first electrode of the first transistor is electrically connected to a data voltage terminal, and a second electrode of the first transistor is electrically connected to a first terminal of the first storage capacitor;

a control electrode of the second transistor is electrically connected to the second electrode of the first transistor and the first terminal of the first storage capacitor, a first electrode of the second transistor is electrically connected to a second electrode of the third transistor, and a second electrode of the second transistor is electrically connected to the voltage boost sub-circuit;

a control electrode of the third transistor is electrically connected to an enabling signal terminal, and a first electrode of the third transistor is electrically connected to a third voltage terminal;

a control electrode of the fifth transistor is electrically connected to a first reset signal terminal, a first electrode of the fifth transistor is electrically connected to a fifth voltage terminal, and a second electrode of the fifth transistor is electrically connected to the second electrode of the second transistor and the voltage boost sub-circuit; and a second terminal of the first storage capacitor is electrically connected to a fourth voltage terminal.

2. The pixel circuit according to claim 1, wherein the voltage boost sub-circuit includes:

a bipolar junction transistor having a base, a collector and an emitter;

a first resistor electrically connected between the driving signal generating sub-circuit and the base of the bipolar junction transistor;

a second resistor electrically connected between a first voltage terminal and the collector of the bipolar junction transistor; and a third resistor electrically connected between a second voltage terminal and the emitter of the bipolar junction transistor, wherein the emitter of the bipolar junction transistor is further electrically connected to the light-emitting sub-circuit.

3. The pixel circuit according to claim 2, wherein the bipolar junction transistor includes a silicon bipolar junction transistor.

4. The pixel circuit according to claim 1, wherein the driving signal generating sub-circuit further includes a fourth transistor; and a control electrode of the fourth transistor is electrically connected to a second scanning signal terminal, a first electrode of the fourth transistor is electrically connected to the data voltage terminal, and a second electrode of the fourth transistor is electrically connected to the first terminal of the first storage capacitor.

5. The pixel circuit according to claim 4, wherein one of the first transistor and the fourth transistor is an N-type transistor, and another of the first transistor and the fourth transistor is a P-type transistor.

6. The pixel circuit according to claim 1, wherein the voltage boost sub-circuit is electrically connected to a first voltage terminal, and the voltage boost sub-circuit is configured to receive a voltage signal from the first voltage terminal that is the same as a voltage signal received by the driving signal generating sub-circuit from the third voltage terminal.

7. A pixel circuit, comprising:

a driving signal generating sub-circuit configured to generate and output an initial driving signal;

a voltage boost sub-circuit electrically connected to the driving signal generating sub-circuit, and configured to receive the initial driving signal, amplify the initial driving signal to generate a target driving signal, and output the target driving signal; and a light-emitting sub-circuit electrically connected to the voltage boost sub-circuit, and configured to receive the target driving signal and be driven by the target driving signal to emit light, wherein the driving signal generating sub-circuit includes a sixth transistor, a seventh transistor, a ninth transistor and a second storage capacitor;

a control electrode of the sixth transistor is electrically connected to a third scanning signal terminal, a first electrode of the sixth transistor is electrically connected to a data voltage terminal, and a second electrode of the sixth transistor is electrically connected to a first terminal of the second storage capacitor; and a control electrode of the seventh transistor is electrically connected to the second electrode of the sixth transistor and the first terminal of the second storage capacitor, a first electrode of the seventh transistor is electrically connected to a second terminal of the second storage capacitor and a sixth voltage terminal, and a second electrode of the seventh transistor is electrically connected to the voltage boost sub-circuit;

a control electrode of the ninth transistor is electrically connected to a second reset signal terminal, a first electrode of the ninth transistor is electrically connected to a seventh voltage terminal, and a second electrode of the ninth transistor is electrically connected to the second electrode of the seventh transistor and the voltage boost sub-circuit.

8. The pixel circuit according to claim 7, wherein the driving signal generating sub-circuit further includes an eighth transistor; and a control electrode of the eighth transistor is electrically connected to a fourth scanning signal terminal, a first electrode of the eighth transistor is electrically connected to the data voltage terminal, and a second electrode of the eighth transistor is electrically connected to the control electrode of the seventh transistor and the first terminal of the second storage capacitor.

9. The pixel circuit according to claim 8, wherein one of the sixth transistor and the eighth transistor is an N-type transistor, and another of the sixth transistor and the eighth transistor is a P-type transistor.

10. The pixel circuit according to claim 7, wherein the voltage boost sub-circuit is electrically connected to a first voltage terminal, and the voltage boost sub-circuit is configured to receive a voltage signal from the first voltage terminal that is the same as a voltage signal received by the driving signal generating sub-circuit from the sixth voltage terminal.

11. The pixel circuit according to claim 1, wherein the light-emitting sub-circuit includes a self-emitting-light device, wherein an anode of the self-emitting-light device is electrically connected to the voltage boost sub-circuit, and a cathode of the self-emitting-light device is electrically connected to an eighth voltage terminal.

12. The pixel circuit according to claim 11, wherein the light-emitting sub-circuit further includes a fourth resistor; and the fourth resistor is electrically connected between the anode of the self-emitting-light device and the voltage boost sub-circuit.

13. The pixel circuit according to claim 1, wherein the driving signal generating sub-circuit further includes a fourth transistor;

a control electrode of the fourth transistor is electrically connected to a second scanning signal terminal, a first electrode of the fourth transistor is electrically connected to the data voltage terminal, and a second electrode of the fourth transistor is electrically connected to the control electrode of the second transistor and the first terminal of the first storage capacitor.

14. The pixel circuit according to claim 7, wherein the driving signal generating sub-circuit further includes an eighth transistor;

a control electrode of the eighth transistor is electrically connected to a fourth scanning signal terminal, a first electrode of the eighth transistor is electrically connected to the data voltage terminal, and a second electrode of the eighth transistor is electrically connected to the control electrode of the seventh transistor and the first terminal of the second storage capacitor.

15. A display apparatus, comprising the pixel circuit according to claim 1.

16. A driving method of the pixel circuit according to claim 1, wherein the driving signal generating sub-circuit includes a first transistor, a second transistor, a third transistor, a fourth transistor and a first storage capacitor; the driving method comprises:

generating, by the driving signal generating sub-circuit, an initial driving signal, and outputting, by the driving signal generating sub-circuit, the initial driving signal;

receiving, by the voltage boost sub-circuit, the initial driving signal, amplifying, by the voltage boost sub-circuit, the initial driving signal to generate a target driving signal, and outputting, by the voltage boost sub-circuit, the target driving signal; and receiving, by the light-emitting sub-circuit, the target driving signal, and emitting, by a self-emitting-light device in the light-emitting sub-circuit, light under driving of the target driving signal; wherein generating, by the driving signal generating sub-circuit, the initial driving signal includes:

the first transistor being turned on under control of a first scanning signal output via a first scanning signal terminal, and the fourth transistor being turned on under control of a second scanning signal output via a second scanning signal terminal;

transmitting, by the first transistor and the fourth transistor, a data voltage signal output via a data voltage terminal to both the first storage capacitor and a control electrode of the second transistor, and storing, by the first storage capacitor, the data voltage signal; and the third transistor being turned on under control of an enabling signal output via an enabling signal terminal, transmitting, by the third transistor, a third voltage signal output via a third voltage terminal to the second transistor, and outputting, by the second transistor, the third voltage signal as the initial driving signal via the second electrode of the second transistor.

17. The pixel circuit according to claim 7, wherein the voltage boost sub-circuit includes:

a bipolar junction transistor having a base, a collector and an emitter;

a first resistor electrically connected between the driving signal generating sub-circuit and the base of the bipolar junction transistor;

a second resistor electrically connected between a first voltage terminal and the collector of the bipolar junction transistor; and a third resistor electrically connected between a second voltage terminal and the emitter of the bipolar junction transistor, wherein the emitter of the bipolar junction transistor is further electrically connected to the light-emitting sub-circuit.

18. The pixel circuit according to claim 7, wherein the light-emitting sub-circuit includes a self-emitting-light device, wherein an anode of the self-emitting-light device is electrically connected to the voltage boost sub-circuit, and a cathode of the self-emitting-light device is electrically connected to an eighth voltage terminal.

19. A display apparatus, comprising the pixel circuit according to claim 7.

* * * * *